US007239846B2

(12) United States Patent
Chiu et al.

(10) Patent No.: US 7,239,846 B2
(45) Date of Patent: Jul. 3, 2007

(54) UP-CONVERSION MODULATION LOOP FOR MULTI-MODE MOBILE COMMUNICATION

(75) Inventors: Huan-Ke Chiu, Hsinchu (TW); June-Ming Hsu, Hsinchu (TW); Tzu-Yi Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 526 days.

(21) Appl. No.: 10/750,771

(22) Filed: Jan. 5, 2004

(65) Prior Publication Data

US 2005/0064819 A1 Mar. 24, 2005

(30) Foreign Application Priority Data

Sep. 18, 2003 (TW) ............................ 92125816 A

(51) Int. Cl.
*H04B 1/00* (2006.01)
*H04B 7/00* (2006.01)

(52) U.S. Cl. ....................... 455/42; 455/260; 455/316; 455/333; 375/271; 375/284; 375/298

(58) Field of Classification Search ............... 455/258, 455/260, 316, 333, 552.1, 42; 375/271, 284, 375/294–296, 298, 302, 376
See application file for complete search history.

(56) References Cited

U.S. PATENT DOCUMENTS

| | | | | |
|---|---|---|---|---|
| 6,560,297 | B1 * | 5/2003 | Broughton | 375/308 |
| 6,693,969 | B1 * | 2/2004 | Montalvo et al. | 375/259 |
| 2004/0017858 | A1 * | 1/2004 | Rozenblit et al. | 375/295 |
| 2004/0053595 | A1 * | 3/2004 | Shinbo et al. | 455/316 |
| 2004/0097210 | A1 * | 5/2004 | Sato | 455/260 |

* cited by examiner

*Primary Examiner*—Matthew Anderson
*Assistant Examiner*—Tuan Pham
(74) *Attorney, Agent, or Firm*—Birch, Stewart, Kolasch, & Birch, LLP

(57) ABSTRACT

The present invention relates to a signal modulation loop for the multi-mode mobile communication. The adaptive up-conversion modulation loop is applied in the multi-mode mobile communication, and is used for signal integration for the communication system comprising the second generation communication system, the global system for mobile communication (GSM), and the third generation communication system, the wideband code division multiple access (WCDMA), so as to achieve the object of multi-mode communication by using a single modulation loop.

13 Claims, 4 Drawing Sheets

UP-CONVERSION MODULATION LOOP FOR MULTI-MODE MOBILE COMMUNICATION

BACKGROUND OF THE INVENTION

1. Field of the Invention

The present invention relates to a signal modulation loop for the multi-mode mobile communication. The adaptive up-conversion modulation loop is used for performing the signal modulation so as to accomplish the signal modulation for the multi-mode mobile communication.

2. Description of the Prior Art

As the mobile phone gets more popular, the communication between the people gets more convenient. Not only the distance of the communication is shortened, but also the speed and efficiency for the proceeding of work are increased. Because of this, the capital and human resource are continuously invested in the development and application of the mobile communication so as to obtain the better quality and service of the communication.

In order to make the transmission speed of the mobile communication faster and the service quality better, a great amount of capital and research effort is invested, and the communication transmission protocol is developed from the first generation, the American mobile phone system (AMPS), to the popularly used second generation, the global system for mobile communication (GSM). Even the mobile phone applying the third generation protocol, the code division multiple access (CDMA), is developed and appeared in the market. All of these protocols are provided for the user to make the communication faster and have more various services. However, during the transition from one generation to another, the signal transmission and modulation between the different communication protocols become the crucial points of the development and research. Therefore, the multi-mode or multi-band signal transceiver is the main subject to be developed and researched for the wireless communication.

The conventional multi-mode adaptive up-conversion modulation loop is composed of a direct digital synthesizer, (DDS), a phase locked loop (PLL), a phase demodulator, a phase comparator and a control amplifier. Please refer to FIG. 1. FIG. 1 is a perspective diagram of a prior art modulation loop. The input modulation signal Mod is inputted into the phase comparator 10, and is compared with the modulation signal outputted by the phase demodulator 11 so as to obtain a difference. This difference is used for controlling the direct feed-in path of an assistant control amplifier 12. After the modulation signal Mod is inputted in the direct digital synthesizer (DDS) 13, the direct digital synthesizer 13 will process it so as to obtain a stable and reliable modulation signal to be inputted into the mixer 14. Furthermore, the mixer 14 will receive the feedback signal transmitted by the frequency divider 1, and then process it so as to directly feed the input modulation signal in the loop filter 15 in the PLL. Thereafter, a adder 16 will receive the signals outputted by the loop filter 15 and the control amplifier 12 so as to obtain a transmission signal having a higher speed and applying broad band. Then, the transmission signal is sent to a voltage controlled oscillator 17, and the voltage controlled oscillator 17 will output an emission signal to a power amplifier 3.

In the prior art, although the different modes of signals can be processed, the design has to be rearranged because of the usage of the direct digital synthesizer (DDS). The modulation loop further comprises the integrated circuits for the base band and radio frequency, and therefore, there are drawbacks for this application. Besides, because of the design method, there are drawbacks of vastly consuming electricity and occupying great area during usage. Thus, for the optimum transmission and design of the multi-mode communication system, the prior art cannot meet the needs of high-speed transmission and various functions for the service.

SUMMARY OF THE INVENTION

The present invention relates to an up-conversion modulation loop for the multi-mode mobile communication. The base band and radio frequency integrated circuits applied in the global system for mobile communication (GSM) are combined with the signal feedback circuit for performing the modulation process so as to accomplish the multi-mode, multi-band signal modulation. Therefore, the requirements of the second and third generation communication transmission protocols will be met.

After the up-conversion modulation loop for the multi-mode mobile communication according to the present invention performs the signal modulation, a structure having the optimum selectivity and compatibility for the frequency arrangement is obtained, and this structure can be applied in the global system for mobile communication (GSM). Therefore, the additional phase demodulator and phase comparator are not required for generating the signal difference. Thus, the objects of capable of being applied in multi-mode communication and having different signal bandwidths cab be achieved.

In order to be compatible with the base band and radio frequency integrated circuits applied in the global system for mobile communication (GSM) and reduce the occupied area and cost, the inventive loop is designed to generate the modulation signal difference after the processing of the phase modulator, and then pass the generated the modulation signal difference through the assistant directly-feed-in path so as to accomplish the processing and outputting of the multi-mode, multi-band signals.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The present invention relates an up-conversion modulation loop for the multi-mode mobile communication. The base band integrated circuit and the radio frequency integrated circuit used in the global system for mobile communication (GSM) are applied with the signal modulation structure of the present invention so as perform the signal modulation and processing. Therefore, the multi-mode and multi-frequency signal modulation can be accomplished by using a single power emitter, and the signal transmission for different communication protocols can be achieved.

Figure 1:
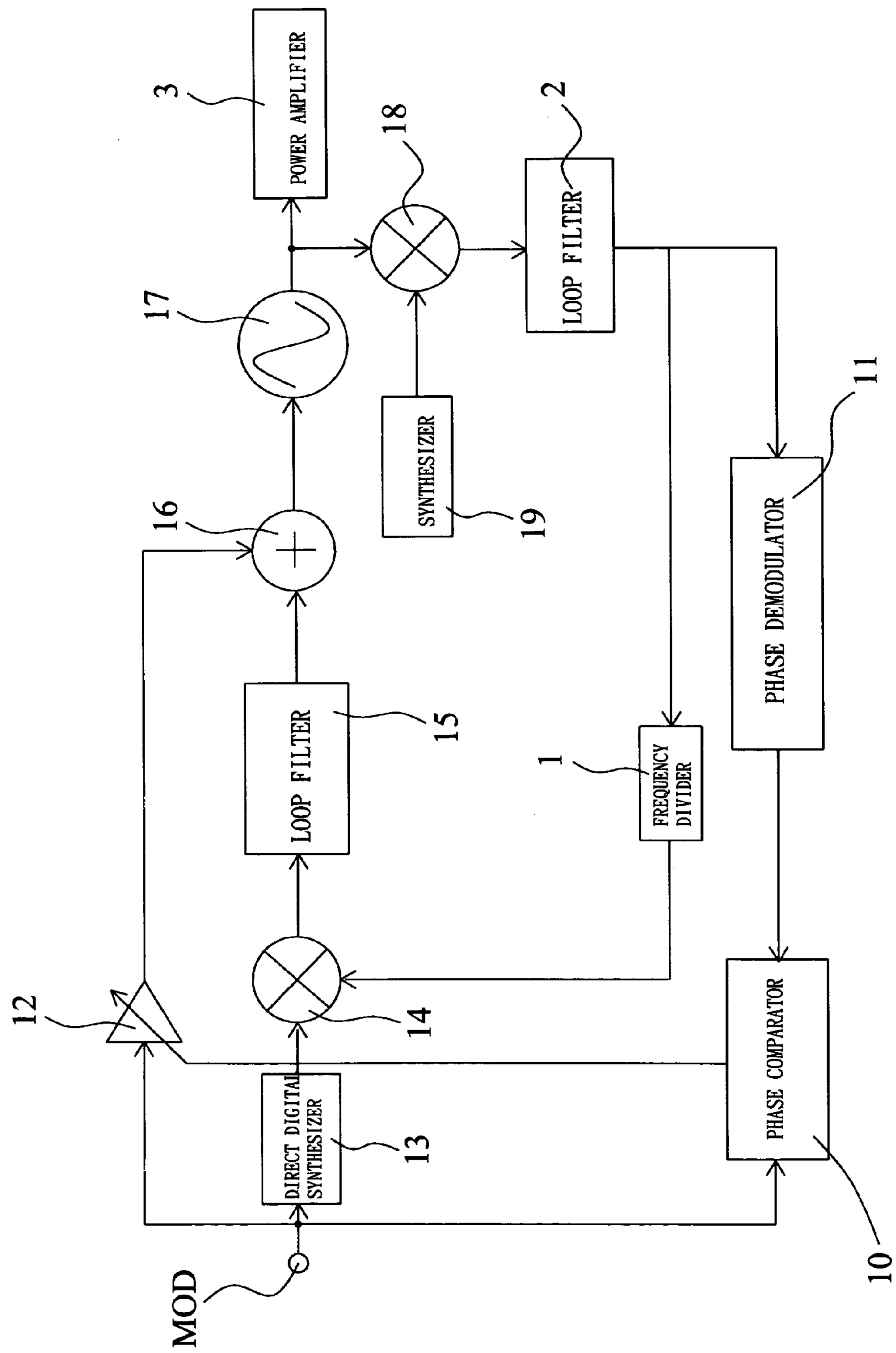
FIG. 1 is a perspective diagram of a prior art modulation loop.
Figure 2:
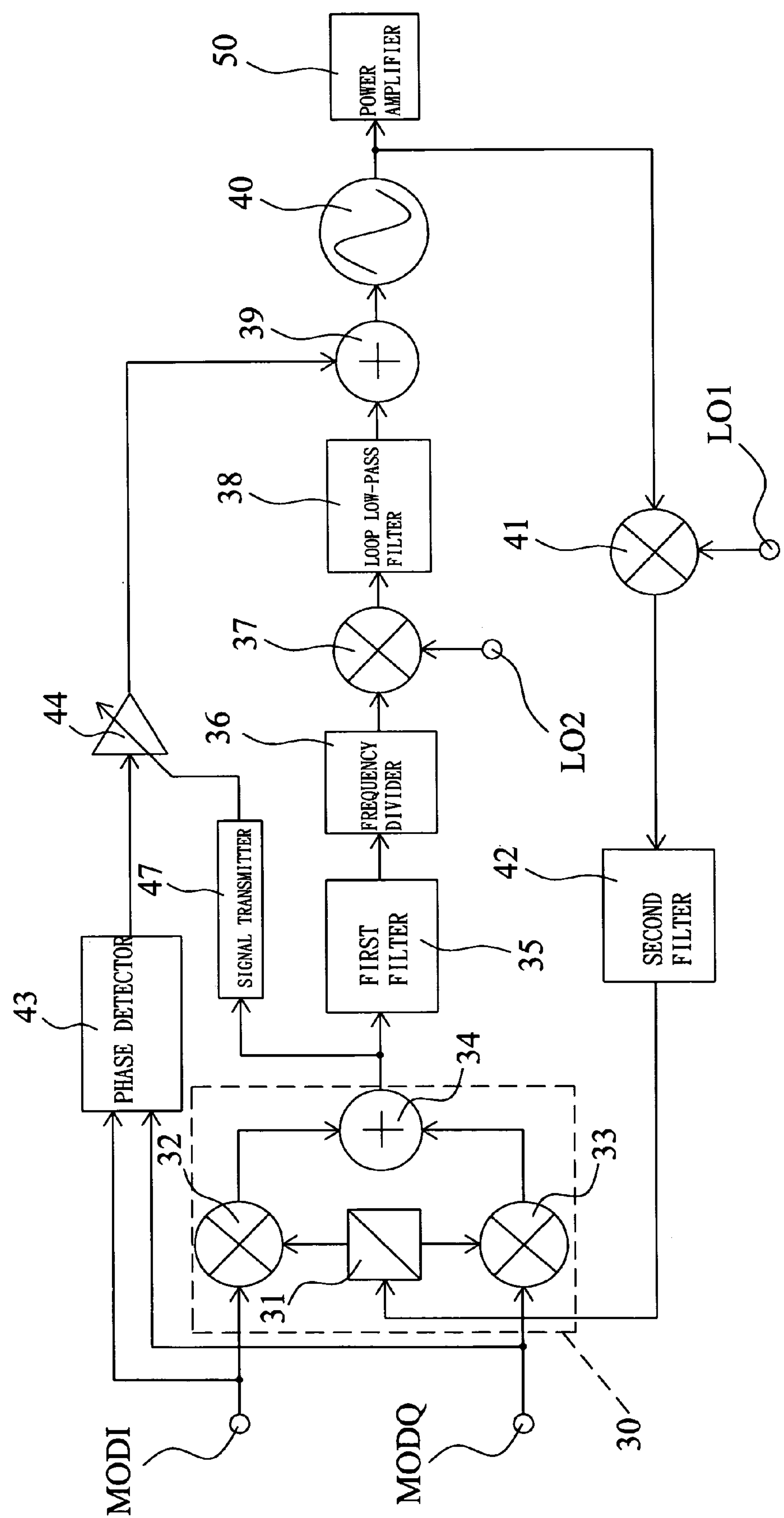
FIG. 2 is a perspective diagram of an up-conversion modulation loop according to a first embodiment of the present invention.

Please refer to FIG. 2. FIG. 2 is a perspective diagram of an up-conversion modulation loop for multi-mode mobile communication according to a first embodiment of the present invention. The loop comprises a phase modulator 30 for receiving a feedback signal, and comparing it with the modulation phase signals Mod I, Mod Q so as to generate a difference. The phase modulator 30 comprises a phase converter 31. The phase converter 31 is used for receiving the feedback signal and performing the quadrature phase generation, and then outputting a in-phase feedback signal and a quadrature phase feedback signal. The in-phase feedback signal is inputted into a first mixer 32. The first mixer 32 will receive the in-phase feedback signal and a first modulation phase signal Mod I outputted from outside of the phase modulator 30. After performing the mixing, the mixed signal is outputted to the first adder 34. The quadrature phase feedback signal is inputted into a second mixer 33. After the second mixer 33 receives the quadrature phase feedback signal and the second modulation phase signal Mod Q outputted from outside of the phase modulator 30, the mixing is performed in the second mixer 33, and then the mixed signal is outputted to the first adder 34. After the first adder 34 receives the mixed signals outputted by the first mixer 32 and the second mixer 33, the signals are added and so as to obtain a phase signal difference. Then, the difference is outputted to the first filter 35 and the signal transmitter 47 outside the phase modulator 30. Therefore, the modulation and processing for the signal frequency and the signal phase can be achieved.

Sequentially, after the first filter 35 receives and processes the signal difference generated by the phase modulator 30, the signal is transmitted to the first frequency divider 36. The first frequency divider 36 will perform the signal down-conversion, and transmit the down-converted signal to the phase frequency comparator 37. The phase frequency comparator 37 not only receives the down-conversion signal transmitted by the first frequency divider 36, but also receives the second down-conversion signal LO2 transmitted from the outside. The phase frequency comparator 37 will compare the phases of the two down-conversion signals, and then output the signal to the loop low-pass filter 38. After the loop low-pass filter 38 finishes the signal filtering, the signal is outputted to the second adder 39.

Furthermore, after the phase modulator 30 accomplishes the processing of the frequency phase, the signal will not only be inputted into the first filter 35, but also the signal transmitter 47. Then, the signal transmitter 47 will transmit the received difference signal to the signal amplifier 44. Besides, the phase detector 43 will receive the modulation phase signals, including a first modulation phase signal Mod I and a second modulation phase signal Mod Q, and then detect the phases of the two modulation phase signals. Thereafter, the phase detector 43 will output the signal to the signal amplifier 44. After the signal amplifier 44 receives the difference signal transmitted by the signal transmitter 47, it will amplify the signal outputted by the phase detector 43 according to the difference signal, and then transmit the amplified signal to the second adder 39.

The second adder 39 will receive the signals transmitted by the loop low-pass filter 38 and the signal amplifier 44 for synthesizing the signals, and then transmit the synthesized signal to the voltage controlled oscillator 40. The voltage controlled oscillator 40 will perform the signal modulation so as to make the phases of the input signal and the output signal consistent. Thereafter, the signal is outputted to the power amplifier 50 for amplifying the signal power so as to accomplish the signal modulation.

The above mentioned is the description for each of the units for the signal modulation according to the first embodiment of the present invention. The third mixer 41 will receive the signal outputted by the voltage controlled oscillator 40 and the first down-conversion signal LO1 inputted from the outside, and then mix the received signals. Thereafter, the third mixer 41 will transmit the mixed signal to the second filter 42. The second filter 42 will reject undesired signals, and then output the feedback signal to the phase converter 31 in the phase modulator 30.

Figure 3:
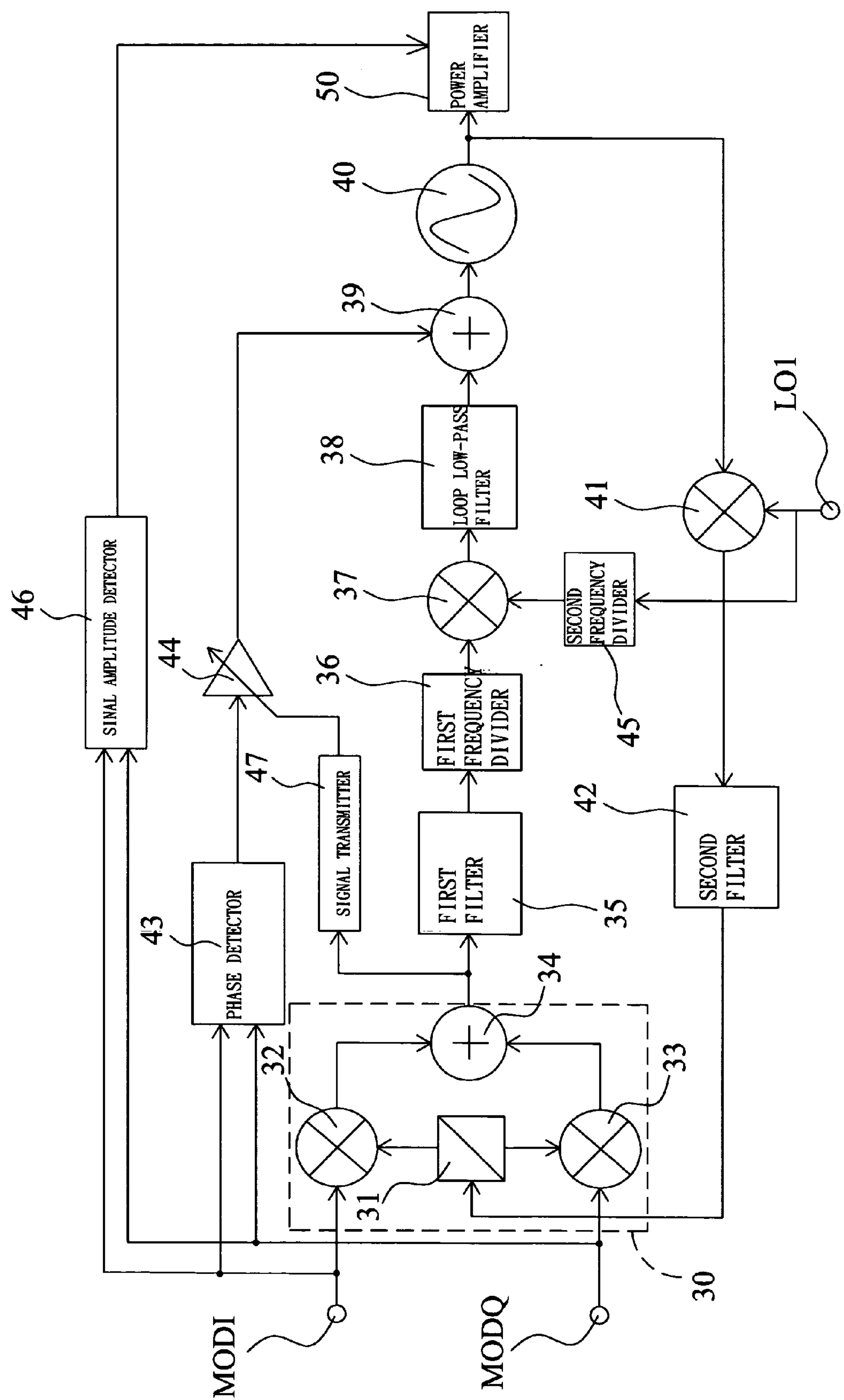
FIG. 3 is a perspective diagram of an up-conversion modulation loop according to a second embodiment of the present invention.

Please refer to FIG. 3. FIG. 3 is a perspective diagram of an up-conversion modulation loop according to a second embodiment of the present invention. Similar to the first embodiment, the loop of the second embodiment also comprises the phase modulator 30, the first filter 35, the first frequency divider 36, the phase frequency comparator 37, the loop low-pass filter 38, the second adder 39 and the voltage controlled oscillator 40. The phase modulator 30 will receive the feedback signal, and compare it with the modulation phase signals Mod I, Mod Q so as to obtain a difference. The phase modulator 30 also comprises the phase converter 31, the first mixer 32, the second mixer 33 and the first adder 34. The phase converter 31 will receive the feedback signal for performing the quadrature generation, and then output a in-phase feedback signal and a quadrature phase feedback signal. The in-phase feedback signal is inputted into the first mixer 32, and the first mixer 32 will receive the in-phase feedback signal and the first modulation phase signal Mod I for mixing the signals, and then output the mixed signal to the first adder 34. The quadrature phase feedback signal is inputted to the second mixer 33. The second mixer 33 will receive the quadrature phase feedback signal and the second modulation phase signal Mod Q for mixing the signals, and then output the mixed signal to the first adder 34. Thereafter, the first adder 34 will add the signals so as to obtain a signal difference, and then output the signal difference to the first filter 35 and the signal transmitter 47.

Continuously, after the phase modulator 30 outputs the difference to the first filter 35 and the signal transmitter 47, the signal transmitter 47 will transmit the received difference signal to the signal amplifier 44. Besides, the phase detector 43 will receive the first modulation phase signal Mod I and the second modulation phase signal Mod Q for detecting the phases of the two modulation phase signals, and then output the signal to the signal amplifier 44. The signal amplifier 44 will amplify the signal outputted by the phase detector 43 according to the difference signal, and then transmit the amplified signal to the second adder 39.

After the first filter 35 receives the difference signal outputted by the phase modulator 30, it will reject undesired signal, and then output the processed signal to the first frequency divider 36. The first frequency divider 36 will down-convert the signal, and then transmit the down-converted signal to the phase frequency comparator 37. The phase frequency comparator 37 not only receive the down-conversion signal transmitted by the first frequency divider 36, but also receive the down-conversion signal transmitted from the outside. Compared with the first embodiment, the down-conversion signal is obtained after the first down-conversion signal LO 1 transmitted from the outside is down-converted by the second frequency divider 45. The phase frequency comparator 37 will compare the phases of the two down-conversion signals, and then output the signal to the loop low-pass filter 38. After the loop low-pass filter 38 accomplishes the signal filtering, the signal is outputted to the second adder 39.

The second adder 39 will receive the signals transmitted from the loop low-pass filter 38 and the signal amplifier 44 for synthesizing the signals, and then transmit the synthesized signal to the voltage controlled oscillator 40. The voltage controlled oscillator 40 will perform the signal modulation so as to make the phases of the input signal and output signal consistent. Therefore, the signal is outputted to the power amplifier 50, and the power amplifier 50 will amplify the signal power so as to finish the signal emission.

As for the feedback signal, the third mixer 41 will receive the signal outputted by the voltage controlled oscillator 40 and the first down-conversion signal LO1 inputted from the outside for mixing the signals, and then transmit the mixed signal to the second filter 42. Thereafter, the second filter 42 will reject undesired signal, and then the feedback signal is outputted to the phase converter 31 in the phase modulator 30.

Besides, another difference between the first and second embodiments is the second embodiment further comprises a signal amplitude detector 46. This signal amplitude detector 46 will receive the modulation phase signals, including the first modulation phase signal Mod I and the second modulation signal Mod Q. Then, the signal amplitude detector 46 will detect the signal amplitude, and then control the output amplitude of power amplifier 50.

Figure 4:
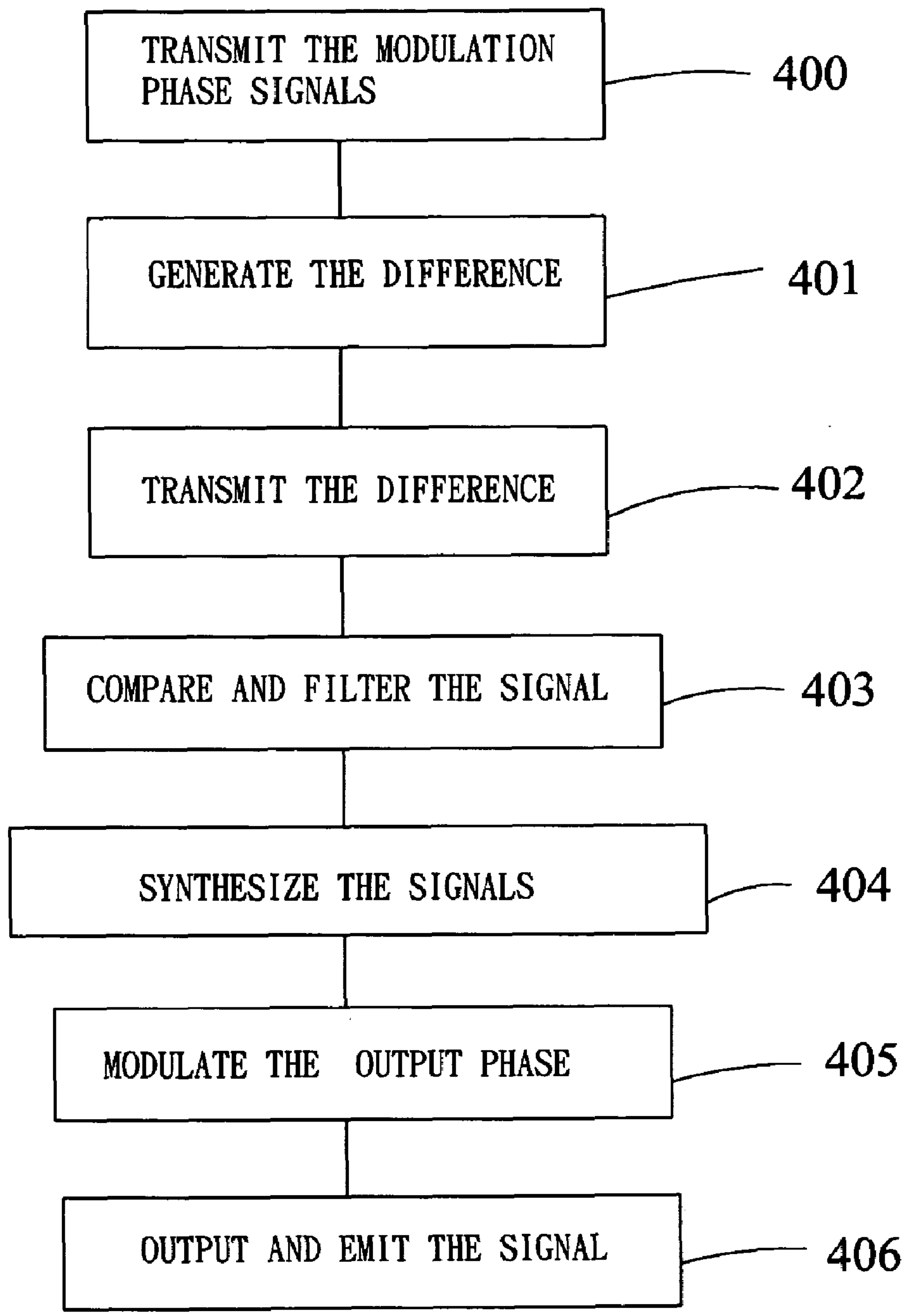
FIG. 4 is a flowchart of the steps performed by the loop according to the invention.

The above is the detailed description of the embodiments of the multi-mode mobile communication up-conversion modulation loops according to the present invention. By means of the signal modulation, detection and transmission, the global system for mobile communication (GSM) and the wideband code division multiple access (WCDMA) are integrated for the signal emission. Please refer to FIG. 4. FIG. 4 is a flowchart of the steps performed by the loop according to the invention. In the step 400, the first modulation phase signal and the second modulation phase signal is transmitted to the phase modulator and the phase detector. The phase modulator is used for comparing the signals, and the phase detector is used for detecting the phases of the two modulation phase signals. Thereafter, the phase modulator will generate the difference in the step 401. In the step 402, the phase modulator will transmit the difference to the signal transmitter and the first filter, and then the first filter will transmit the difference to the phase frequency comparator and the loop low-pass filter so as to compare and filter the signals (step 403). Then, a signal amplifier will amplify the signals outputted by the phase detector and the signal transmitter, and then a first adder will synthesize the signals in the step 404. The synthesized frequency signal is transmitted to a voltage controlled oscillator, and the voltage controlled oscillator will modulate the phase frequencies of the input and output signals in the step 405 so as make the modulation phases of the output and input signals consistent. Finally, a modulation signal with consistent phase is outputted to a power amplifier so as to output and emit the multi-mode mobile communication up-conversion modulation signal in the step 406.

In summary, the present invention effectively process the signals used in the second generation, the global system for mobile communication (GSM), and the third generation, the wideband code division multiple access (WCDMA), communication protocols, and a single circuit is used for performing the signal up-conversion and modulation. Therefore, the communication efficiency can be promoted and the drawbacks of the prior art can be avoided.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An up-conversion modulation loop for multi-mode mobile communication being used to perform signal modulation and processing so as to transmit the signal by using a single power emitter, the loop comprising:

- a phase modulator for receiving a feedback signal and a modulation phase signal, and comparing the two signal so as to generate a difference;
- a first filter for receiving the difference generated by the phase modulator, and transmitting it to a frequency divider;
- a first frequency divider for receiving the signal transmitted by the first filter so as to perform the signal down-conversion, and transmitting the signal to a phase frequency comparator;
- a phase frequency comparator for receiving the signal transmitted by the first frequency divider and a second down-conversion signal so as to compare the signal phases, and transmitting the signal to a loop low-pass filter;
- a loop low-pass filter for receiving the signal transmitted by the phase frequency comparator so as to perform the signal filtering, and transmitting the signal to a second adder;
- a second adder for receiving the signals transmitted by the loop low-pass filter and a signal amplifier so as to synthesize the signals, and transmitting the synthesized signal to a voltage controlled oscillator;
- a voltage controlled oscillator for receiving the signal transmitted by the second adder so as to perform the signal modulation and make the phases of the input signal and the output signal consistent, and outputting the signal to a power amplifier for signal emitting;
- a phase detector for receiving the modulation phase signal so as to detect the signal phase;
- a signal amplifier for receiving the detection signal transmitted by the phase detector and the signal outputted by a signal transmitter so as to perform the signal amplifying, and transmitting the amplified signal to the second adder;
- a signal transmitter for receiving the difference transmitted by the phase modulator, and transmitting it to the signal amplifier;
- wherein the multi-mode signal modulation is accomplished and the modulated signal is transmitted to the next level processing unit for signal emission.

2. The up-conversion modulation loop of claim 1, wherein the phase modulator comprises:

a phase converter for receiving the feedback signal, and performing the phase generation so as to output a in-phase feedback signal and a quadrature phase feedback signal;

a first mixer for receiving the in-phase feedback signal outputted by the phase converter and a first modulation phase signal outputted from outside of the phase modulator, and then performing the mixing so as to outputting the mixed signal to a first adder;

a second mixer for receiving the quadrature phase feedback signal outputted by the phase converter and a second modulation phase signal outputted from outside of the phase modulator, and then performing the mixing so as to output the mixed signal to the first adder;

a first adder for receiving the mixed signals outputted by the first mixer and the second mixer, and then performing the signal comparing so as to output the signal to the first filter and the signal transmitter outside the phase modulator.

3. The up-conversion modulation loop of claim 2, wherein the feedback signal is fed back to the phase converter in the phase modulator after a second filter receives the signal transmitted by a third mixer and perform the frequency filtering.

4. The up-conversion modulation loop of claim 3, wherein the third mixer is used for receiving the signal outputted by the voltage controlled oscillator, and mixing it with a first down-conversion signal so as to transmit the mixed signal to the second filter.

5. An up-conversion modulation loop for multi-mode mobile communication being used to perform signal modulation and processing so as to emit the signal by using a single power emitter, the loop comprising:

a phase modulator for receiving a feedback signal and a modulation phase signal, and adding the two signals so as to generate a difference;

a first filter for receiving the difference generated by the phase modulator, and transmitting it to a frequency divider;

a first frequency divider for receiving the signal transmitted by the first filter so as to perform the signal down-conversion, and transmitting the signal to a phase frequency comparator;

a second frequency divider for receiving a first down-conversion signal so as to perform the frequency division on the signal, and then outputting the signal to the phase frequency comparator;

a phase frequency comparator for receiving the signals processed by the first frequency divider and the second frequency divider so as to compare the signal phases, and then outputting the signal to a loop low-pass filter;

a loop low-pass filter for receiving the signal transmitted by the phase frequency comparator so as to perform the signal filtering, and transmitting the signal to a second adder;

a second adder for receiving the signals transmitted by the loop low-pass filter and a signal amplifier so as to synthesize the signals, and transmitting the synthesized signal to a voltage controlled oscillator;

a voltage controlled oscillator for receiving the signal transmitted by the second adder so as to perform the signal modulation and make the phases of the input signal and the output signal consistent, and outputting the signal to a power amplifier for signal emitting;

a phase detector for receiving the modulation phase signal so as to detect the signal phase;

a signal amplifier for receiving the detection signal transmitted by the phase detector and the signal outputted by a signal transmitter so as to perform the signal amplifying, and transmitting the amplified signal to the second adder;

a signal transmitter for receiving the difference transmitted by the phase modulator, and transmitting it to the signal amplifier;

a signal amplitude detector for receiving the modulation phase signal so as to detect the signal amplitude, and outputting it to the power amplifier;

wherein the multi-mode signal modulation is accomplished and the modulated signal is transmitted to the power amplifier for signal emission.

6. The up-conversion modulation loop of claim 5, wherein the phase modulator comprises:

a phase converter for receiving the feedback signal, and performing the phase modulation so as to output a in-phase feedback signal and a quadrature phase feedback signal;

a first mixer for receiving the in-phase feedback signal outputted by the phase converter and a first modulation phase signal outputted from outside of the phase modulator, and then performing the mixing so as to outputting the mixed signal to a first adder;

a second mixer for receiving the quadrature phase feedback signal outputted by the phase converter and a second modulation phase signal outputted from outside of the phase modulator, and then performing the mixing so as to output the mixed signal to the first adder;

a first adder for receiving the mixed signals outputted by the first mixer and the second mixer, and then performing the signal comparing so as to output the signal to the first filter and the signal transmitter outside the phase modulator.

7. The up-conversion modulation loop of claim 6, wherein the feedback signal is fed back to the phase converter in the phase modulator after a second filter receives the signal transmitted by a third mixer and perform the frequency filtering.

8. The up-conversion modulation loop of claim 7, wherein the third mixer is used for receiving the signal outputted by the voltage controlled oscillator, and mixing it with a first down-conversion signal so as to transmit the mixed signal to the second filter.

9. The up-conversion modulation loop of claim 5, wherein the signal amplitude detector further comprises a switch for detecting the amplitude of the multi-mode frequency signal.

10. An up-conversion modulation loop for the multi-mode mobile communication being used for performing the signal modulation, detection and transmission so as to integrate the global system for mobile communication (GSM) and the wideband code division multiple access (WCDMA) for signal emission, the loop performing the following steps:

transmitting a modulation phase signal wherein a first modulation phase signal and a second modulation phase signal are transmitted to a phase modulator and a phase detector, and the phase modulator is used for comparing the signals, and the phase detector is used for detecting the phases of the two modulation phase signals;

generating a difference after the signal comparing by the phase modulator;

transmitting the generated difference to a signal transmitter and a first filter;

comparing the signal frequencies and filtering the signals wherein the first filter transmits the difference to a phase frequency comparator and a loop low-pass filter so as to perform the comparing and the filtering;

synthesizing the signals wherein a first adder is used for synthesizing the signals, and transmitting the synthesized signal to a voltage controlled oscillator;

modulating the phase frequencies wherein the voltage controlled oscillator is used for modulating the input and output signals so as to make the modulated phases of the output and input signals consistent;

outputting and emitting the signal to output the modulated signal with consistent phase to a power amplifier so as to accomplish the up-conversion modulation for the multi-mode mobile communication.

11. The up-conversion modulation loop of claim 10, wherein the voltage controlled oscillator further outputs the signal to a third mixer, and the third mixer is used for receiving a first down-conversion signal from outside, and outputting a feedback signal to a second filter, and after the second filter processes the signal, the feedback signal is outputted to the phase modulator.

12. The up-conversion modulation loop of claim 10, wherein the phase modulator further comprises:

a phase converter for receiving the feedback signal, and performing the phase modulation so as to output a in-phase feedback signal and a quadrature phase feedback signal;

a first mixer for receiving the positive phase feedback signal outputted by the phase converter and a first modulation phase signal outputted form outside of the phase modulator, and then performing the mixing so as to outputting the mixed signal to a first adder;

a second mixer for receiving the quadrature phase feedback signal outputted by the phase converter and a second modulation phase signal outputted from outside of the phase modulator, and then performing the mixing so as to output the mixed signal to the first adder;

a first adder for receiving the mixed signals outputted by the first mixer and the second mixer, and then performing the signal comparing so as to output the signal to the first filter and the signal transmitter outside the phase modulator.

13. The up-conversion modulation loop of claim 10, wherein the modulation phase signal is further inputted into a signal amplitude detector, and the signal amplitude detector will detect the amplitude of the signal, and output the signal to the power amplifier.

* * * * *